United States Patent [19]

Okuyama et al.

[11] 4,238,548

[45] Dec. 9, 1980

[54] MAGNETIC RECORDING MEDIUM

[75] Inventors: Kiyotaka Okuyama; Akihiko Hosaka, both of Tokyo, Japan

[73] Assignee: TDK Electronics Company Limited, Tokyo, Japan

[21] Appl. No.: 17,971

[22] Filed: Mar. 6, 1979

[30] Foreign Application Priority Data

Mar. 10, 1978 [JP] Japan .................... 53/26611

[51] Int. Cl.² .................... H01F 10/02
[52] U.S. Cl. .................... 428/480; 428/522; 428/900
[58] Field of Search .................... 427/127–132, 427/48; 428/900, 480, 522; 252/62.54

[56] References Cited

U.S. PATENT DOCUMENTS

| | | | |
|---|---|---|---|
| 4,066,564 | 1/1978 | Sasazawa et al. | 427/128X |
| 4,135,031 | 1/1979 | Akashi et al. | 427/128 X |
| 4,152,485 | 5/1979 | Mizumura et al. | 427/128 X |

Primary Examiner—Bernard D. Pianalto
Attorney, Agent, or Firm—Oblon, Fisher, Spivak, McClelland & Maier

[57] ABSTRACT

A magnetic recording medium comprises a substrate coated with a magnetic layer wherein a magnetic powder is orientated in a cured binder comprising a vinyl chloride, vinyl acetate copolymer having more than 10 wt. % of vinyl alcohol component and a polyester and a nitrocellulose.

4 Claims, 3 Drawing Figures

MAGNETIC RECORDING MEDIUM

DETAILED DESCRIPTION OF THE INVENTION

1. Field of the Invention

The present invention relates to an improvement of a magnetic recording medium. More particularly, it relates to a magnetic recording medium which has high orientation of a magnetic powder, high wear resistance and high running safety which are required for a magnetic recording tape for video.

2. Description of the Prior Arts

A magnetic recording medium has been usually used as analogue recording medium or digital recording medium in a form of a tape or a sheet. Such magnetic recording medium is prepared by coating a magnetic composition layer dispersing a magnetic powder in a resin, on a substrate. The magnetic recording medium is contacted with a magnetic head with high friction in a reproduction whereby a surface of a magnetic layer should have high wear resistance. In a usage as a magnetic recording tape for video, higher relative speed of a tape to a magnetic head is especially required in comparison with a relative speed for a tape recorder. The friction is remarkably high and severe wear resistance is required. A tape running durability should be higher than the normal durability even though the friction is so high. The magnetic layer comprises a magnetic powder and a binder as main components. High packing density of the magnetic powder is required and high orientation of the magnetic powder is required for applying magnetic field before drying and solidifying the magnetic layer in order to obtain high magnetic orientation.

Therefore, a physical property of the binder, a property of the surface of the binder layer and a dispersing condition of the magnetic powder after the drying and solidification should be selected to be suitable for imparting desired abrasion resistance, running durability and high orientation of the magnetic powder.

For example, a binder comprising nitrocellulose and polyurethane has been proposed, however satisfactory characteristics have not been given such binder composition can form a magnetic coating layer having smooth surface, however a packing density of the magnetic powder can not be high and high orientation can not be given and the magnetic coating layer is easily worn, disadvantageously.

There are other proposals, however a magnetic recording tape having said characteristics have not been obtained.

SUMMARY OF THE INVENTION

It is an object of the present invention to provide a magnetic recording medium which has high orientation of a magnetic powder, high wear resistance and high running durability which are especially suitable for using under severe conditions such as video tape.

The foregoing and other objects of the present invention have been attained by providing a magnetic recording medium which has excellent orientation of the magnetic powder, wear resistance and running durability which comprises a binder comprising a vinyl chloride-vinyl acetate copolymer having more than 10 wt.% of vinyl alcohol component, and a polyester and nitrocellulose.

DETAILED DESCRIPTION OF THE PREFERRED EMBODIMENTS

Figure 1:
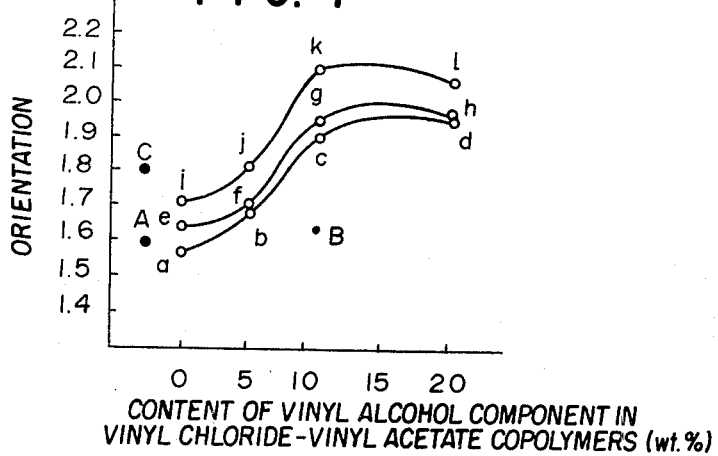
FIG. 1 is a graph showing a relation of orientations of a magnetic powder and contents of vinyl alcohol component in vinyl chloride-vinyl acetate copolymers (wt.%).

A viscosity, a hardness after drying, a solubility in a solvent a dispersibility for a magnetic powder are varied depending upon a content of vinyl alcohol component in a vinyl chloride-vinyl acetate copolymer. As the results of experiments, it has been found that a vinyl chloride-vinyl acetate copolymer having more than 10 wt.% of vinyl alcohol component is suitable for the purpose of the present invention.

The vinyl alcohol component contributes an improvement of adsorption on the magnetic powder whereby a binder is combined well to improve a dispersibility and the characteristics are improved.

Nitrocellulose has high affinity to a magnetic powder and is used for highly dispersing the magnetic powder.

It has been known to incorporate nitrocellulose in a binder.

The vinyl chloride-vinyl acetate copolymer having more than 10 wt.% of vinyl alcohol component is highly miscible with nitrocellulose and the dispersibility for the magnetic powder is further improved in the binder incorporating the special vinyl chloride-vinyl acetate copolymer.

An orientation of the magnetic powder and a smoothness of a coated surface are improved by a synergetical principle of the special vinyl chloride-vinyl acetate copolymer and nitrocellulose.

The coated layer made of only the special vinyl chloride-vinyl acetate copolymer and nitrocellulose is relatively soft and easily peelable from a substrate, disadvantageously. When a polyester is incorporated in the binder of the specific vinyl chloride-vinyl acetate copolymer and nitrocellulose, an adhesion to the substrate is improved and the binder has harder property to form a coated layer having excellent wear resistance.

In a preparation of the magnetic recording tape, the magnetic powder, the vinyl chloride-vinyl acetate copolymer having more than 10 wt.% of vinyl alcohol component, nitrocellulose and a polyester are blended in a presence of suitable solvent. The blending is carried out in suitable equipment such as a ball mill. A small amount of a lubricant can be incorporated.

It is usual to blend about 3 to 10 wt. parts of the vinyl chloride-vinyl acetate copolymer having more than 10 wt.% of vinyl alcohol component, about 3 to 10 wt.% of nitrocellulose, and about 5 to 20 wt. parts of a polyester to 100 wt. parts of the magnetic powder. This ratios are not critical and a composition of the components at the other ratios may be used since the required characteristic of the tape are varied depending upon a usage.

The lubricant is usually incorporated at a ratio of about 1 to 2 wt. parts to 100 wt. parts of the magnetic powder and the solvent especially a mixed solvent is usually incorporated at a ratio of 150 to 250 wt. parts to 100 wt. parts of the magnetic powder. These ratios are not critical and can be controlled depending upon kinds of main components of the binder.

A typical solvent is a mixed solvent and suitable solvents include methyl ethyl ketone, methyl isobutyl ketone, and toluene.

A silicone oil is usually used as a lubricant.

After blending thoroughly the above-mentioned components, a suitable amount of a curing agent such as polyisocyanate is added and the mixture is further blended to prepare a coating composition. The coating composition is uniformly coated on a substrate such as a substrate made of polyethyleneterephthalate.

The conventional coating method such as doctor method, reverse-roll method, gravure method, and flow-spreading method can be employed depending upon a required thickness of the magnetic coating film. The coating composition is coated at suitable thickness for a desired dry thickness, and it is treated by a calendering treatment and a heat-curing treatment, and the resulting coated product is cut in suitalbe size to obtain a magnetic recording tape.

The magnetic powder can be the conventional magnetic powder such as $\gamma$-$Fe_2O_3$ (cobalt dope), Fe-Co-Ni alloy, $\gamma$-$Fe_2O_3$. $Fe_3O_4$ and $CrO_2$.

| Composition 1: | |
| --- | --- |
| $\gamma$-$Fe_2O_3$ magnetic powder (cobalt dope) | 400 wt. parts |
| Polyester (Bairon-300 manufactured by Toyo Boseki K.K.) | 70 wt. parts |
| Nitrocellulose (H ½ sec.* manufactured by Asahi Kasei K.K.) | 15 wt. parts |
| Vinyl chloride-vinyl acetate copolymer (various content of vinyl alcohol component) | 15 wt. parts |
| Lubricant | 5 wt. parts |
| Methyl ethyl ketone | 280 wt. parts |
| Methyl isobutyl ketone | 280 wt. parts |
| Toluene | 280 wt. parts |

Note: *viscosity in Standard of Hercules Powder Co.

Four kinds of the compositions a, b, c and d were prepared by using 4 kinds of vinyl chloride-vinyl acetate copolymer having a content of vinyl alcohol component of 0, 6, 10 or 20 wt.% in the formula.

| Composition 2: | |
| --- | --- |
| $\gamma$-$Fe_2O_3$ magnetic powder (cobalt dope) | 400 wt. parts |
| Polyester (Bairon-300 manufactured by Toyo Boseki K.K) | 50 wt. parts |
| Nitrocellulose (H ½ sec.* manufactured by Asahi Kaseki K.K.) | 25 wt. parts |
| Vinyl chloride-vinyl acetate copolymer (various content of vinyl alcohol component) | 25 wt. parts |
| Lubricant | 5 wt. parts |
| Methyl ethyl ketone | 280 wt. parts |
| Methyl isobutyl ketone | 280 wt. parts |
| Toluene | 280 wt. parts |

Four kinds of the compositions e, f, g and h were prepared by using 4 kinds of vinyl chloride-vinyl acetate copolymer having a content of vinyl alcohol component of 0, 6, 10 or 20 wt.% in the formula.

| Composition 3: | |
| --- | --- |
| $\gamma$-$Fe_2O_3$ magnetic powder (cobalt dope) | 400 wt. parts |
| Polyester (Bairon-300 manufactured by Toyo Boseki K.K.) | 30 wt. parts |
| Nitrocellulose (H ½ sec.* manufactured by Asahi Kasei K.K.) | 30 wt. parts |
| Vinyl chloride-vinyl acetate copolymer (various content of vinyl alcohol component) | 35 wt. parts |
| Lubricant | 5 wt. parts |
| Methyl ethyl ketone | 280 wt. parts |
| Methyl isobutyl ketone | 280 wt. parts |
| Toluene | 280 wt. parts |

Four kinds of the compositions i, j, k and l were prepared by using 4 kinds of vinyl chloride-vinyl acetate copolymer having a content of vinyl alcohol component of 0, 6, 10 or 20 wt.% in the formula.

In the compositions 1 a to d; 2 e to h and 3 i to l, contents of vinyl chloride component and vinyl acetate component are as follows.

| Vinyl alcohol | Vinyl chloride | Vinyl acetate |
| --- | --- | --- |
| 0 wt. % | 87 wt. % | 13 wt. % |
| 6 wt. % | 91 wt. % | 3 wt. % |
| 10 wt. % | 86 wt. % | 4 wt. % |
| 20 wt. % | 75 wt. % | 5 wt. % |

Each of the twelve compositions was prepared by mixing the components in a ball mill to disperse well and adding 8 wt. parts of Dismodule L (polyisocyanate manufactured by Bayer Co.) as curing agent and mixing thoroughly the mixture to form a coating composition.

Each coating composition was coated on a substrate made of polyethyleneterephthalate having thickness of 20$\mu$ to give a dry thickness of 6$\mu$ and a surface processing treatment was carried out by a super calendering method and then, the coated layer was cured by heating at 80° C. for 48 hours. The product was cut in each width of 5.1 cm (½ inch) to prepare a magnetic recording tape.

As references, the following compositions (one of indispensable component is omitted) were used.

| Reference A (no vinyl chloride-vinyl acetate copolymer) | |
| --- | --- |
| $\gamma$-$Fe_2O_3$ magnetic powder (cobalt dope) | 400 wt. parts |
| Polyester (Bairon-300 manufactured by Toyo Boseki K.K.) | 50 wt. parts |
| Nitrocellulose (H ½ sec.* manufactured by Asahi Kaseki K.K.) | 50 wt. parts |
| Lubricant | 5 wt. parts |
| Methyl ethyl ketone | 280 wt. parts |
| Methyl isobutyl ketone | 280 wt.parts |
| Toluene | 280 wt. parts |

| Reference B (no nitrocellulose) | |
| --- | --- |
| $\gamma$-$Fe_2O_3$ magnetic powder (cobalt dope) | 400 wt. parts |
| Polyester (Bairon-300 manufactured by Toyo Boseki K.K.) | 50 wt. parts |
| Vinyl chloride-vinyl acetate copolymer (content of vinyl alcohol component 10 wt. %) | 50 wt. parts |
| Lubricant | 5 wt. parts |
| Methyl ethyl ketone | 280 wt. parts |
| Methyl isobutyl ketone | 280 wt. parts |
| Toluene | 280 wt. parts |

| Reference C (no vinyl chloride-vinyl acetate copolymer: addition of polyurethane) | |
| --- | --- |
| $\gamma$-$Fe_2O_3$ magnetic powder (cobalt dope) | 400 wt. parts |

-continued

| Reference C (no vinyl chloride-vinyl acetate copolymer: addition of polyurethane) | |
|---|---|
| Polyurethane (No. 5033 manufactured by Nippon Polyurethane K.K.) | 50 wt. parts |
| Nitrocellulose (H ½ sec.* manufactured by Asahi Kasei K.K.) | 50 wt. parts |
| Lubricant | 5 wt. parts |
| Methyl ethyl ketone | 280 wt. parts |
| Methyl isobutyl ketone | 280 wt. parts |
| Toluene | 280 wt. parts |

In accordance with the process of Examples, each of the compositions A, B and C was used instead of the composition 1, 2 or 3 magnetic recording tapes were prepared.

Figure 2:
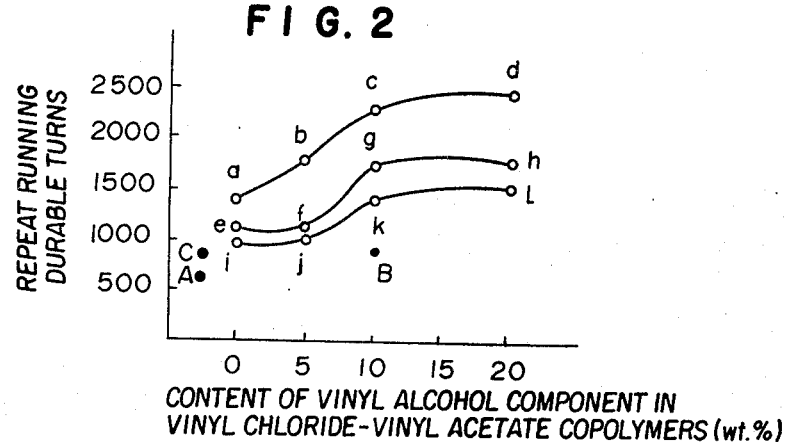
FIG. 2 is a graph showing a relation of repeat running durable turns and contents of vinyl alcohol component in vinyl chloride-vinyl acetate copolymers (wt.%).
Figure 3:
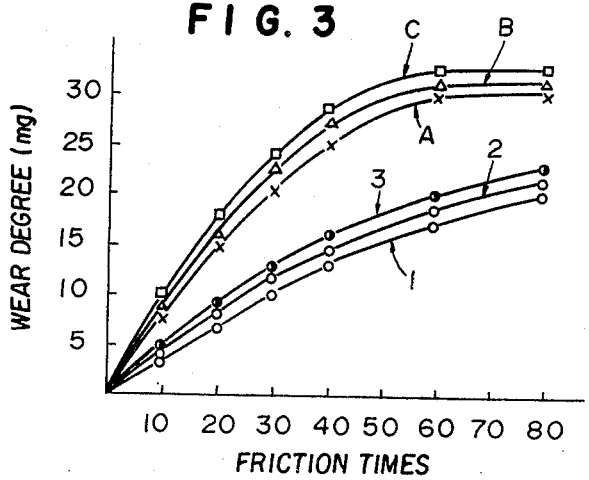
FIG. 3 is a graph showing a relation of wear degrees and friction times for a binder comprising the vinyl chloride-vinyl acetate copolymer having 10 wt.% vinyl alcohol component and a reference sample.

Orientations, repeat running durable turns and wear degrees of the magnetic recording tapes were tested. The results are shown in FIGS. 1, 2 and 3.

FIG. 1 shows a relation of orientations of the magnetic powder and contents of vinyl alcohol component in the vinyl chloride-vinyl acetate copolymers (wt.%) in 15 kinds of the samples.

The orientation is a ratio of transversal acicular ratio to longitudinal acicular ratio.

The data of the compositions A and C are shown at left side of the graph since the special copolymer is not incorporated. As it is clear from FIG. 1, the orientations of the products using the compositions 1-c, 1-d, 2-g, 2-h, 3-k and 3-l using the vinyl chloride-vinyl acetate copolymers having more than 10 wt.% of vinyl alcohol component are superior to those of the compositions 1-a, 1-b, 2-e, 2-f, 3-i and 3-j using the vinyl chloride-vinyl acetate copolymers having 0 or 5 wt.% of vinyl alcohol component or the compositions A, B and C.

FIG. 2 shows a relation of repeat running durable turns and contents of vinyl alcohol component in vinyl chloride-vinyl acetate copolymers. It is clear that the samples containing the vinyl chloride-vinyl acetate copolymer having more than 10 wt.% of vinyl alcohol component had superior effect.

The friction tests were carried out by using samples of the Compositions 1-c, 2-g and 3-k which contain the vinyl chloride-vinyl acetate copolymer having more than 10 wt.% of vinyl alcohol component and the samples of the References A, B and C by using a tubular friction tester. FIG. 3 shows a relation of wear degrees and friction times.

As it is clear from the graph, the wear resistances of the magnetic recording tapes are superior. In the References, the wear degree was significantly increased by increasing the friction times and substantial parts of the coated layers were worn off at about 60 times of the friction times. In the cases of the magnetic recording tapes of the present invention, the wear degrees at 60 times of the friction times were about ½ to those of the References, to show the fact that the magnetic recording tape of the present invention had a wear resistance of about 2 times of that of the References.

As described above, in accordance with the present invention, the vinyl chloride-vinyl acetate copolymer having more than 10 wt.% of vinyl alcohol component is used and nitrocellulose and polyester are combined to impart synergetic effect whereby the orientation, the repeat running durability and the wear resistance are superior to those of the magnetic recording tape prepared by using the conventional binder. The components used in the preparation are easily available in low cost and the conventional coating method can be applied and the contribution of the present invention in this field is significant.

We claim:

1. A magnetic recording medium which comprises a substrate coated with a magnetic layer wherein a magnetic powder is oriented in a cured binder comprising 3 to 10 wt. parts of a vinyl chloride-vinyl acetate copolymer having 10 to 20 wt.% of vinyl alcohol component, 5 to 20 wt. parts of a polyester and 3 to 10 wt. parts of a nitrocellulose; and wherein said magnetic powder is present in an amount of 100 wt. parts.

2. A magnetic recording medium according to claim 1 wherein the magnetic layer further comprises a lubricant.

3. A magnetic recording medium according to claim 1 which is prepared by dispersing said magnetic powder in a coating composition comprising said binder and an organic solvent; admixing a curing agent with said dispersion of magnetic powder in said coating composition; coating said admixture on said substrate; and drying and solidifying the coating composition after an orientation of the magnetic powder.

4. A magnetic recording medium according to claim 1 wherein said vinyl chloride-vinyl acetate copolymer comprises 40 to 90 wt.% of vinyl chloride component 1 to 40 wt.% of vinyl acetate component.

* * * * *